United States Patent
Fujikawa et al.

(10) Patent No.: US 8,196,880 B2
(45) Date of Patent: Jun. 12, 2012

(54) SUPPORT STAND FOR ELECTRONIC DEVICE

(75) Inventors: Akihiro Fujikawa, Osaka (JP); Shinichiro Sakamoto, Osaka (JP); Yuki Ogaki, Osaka (JP); Hideo Yonezawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 68 days.

(21) Appl. No.: 12/557,564

(22) Filed: Sep. 11, 2009

(65) Prior Publication Data

US 2010/0065695 A1 Mar. 18, 2010

(30) Foreign Application Priority Data

Sep. 12, 2008 (JP) ................................. 2008-234551

(51) Int. Cl.
*F16M 11/20* (2006.01)
(52) U.S. Cl. ................. 248/188.1; 248/346.03; 248/127
(58) Field of Classification Search .................. 248/688, 248/127, 371, 176.1, 188.1, 188.8, 188.9, 248/188.91, 346.01, 346.03, 121, 917, 918, 248/923, 177.1, 176.3, 125.7, 676, 678, 466, 248/481, 158
See application file for complete search history.

(56) References Cited

U.S. PATENT DOCUMENTS

| | | | | |
|---|---|---|---|---|
| 5,603,478 A | * | 2/1997 | Wang | 248/371 |
| 7,651,062 B2 | * | 1/2010 | Matsutani et al. | 248/176.3 |
| 7,672,121 B2 | * | 3/2010 | Li et al. | 361/679.21 |
| 7,744,045 B2 | * | 6/2010 | Akagawa et al. | 248/121 |
| 7,819,372 B2 | * | 10/2010 | Huang et al. | 248/346.01 |
| 7,839,626 B2 | * | 11/2010 | Chen et al. | 361/679.07 |
| 2003/0230693 A1 | * | 12/2003 | Yen et al. | 248/346.3 |
| 2005/0098700 A1 | | 5/2005 | Tien et al. | |
| 2006/0289716 A1 | | 12/2006 | Cai et al. | |
| 2007/0008686 A1 | | 1/2007 | Jang | |
| 2007/0077793 A1 | | 4/2007 | Ko | |
| 2007/0097608 A1 | * | 5/2007 | Matsutani et al. | 361/681 |
| 2007/0210220 A1 | * | 9/2007 | Sawai et al. | 248/122.1 |
| 2009/0206222 A1 | * | 8/2009 | Huang et al. | 248/346.01 |

FOREIGN PATENT DOCUMENTS

| | | |
|---|---|---|
| EP | 1 785 660 A2 | 5/2007 |
| JP | 3072380 U | 7/2000 |
| JP | 2006-173849 A | 6/2006 |

OTHER PUBLICATIONS

European Search Report of corresponding EP Application. No. 09 17 0188.8 dated Feb. 7, 2012.

* cited by examiner

*Primary Examiner* — Nkeisha Smith
(74) *Attorney, Agent, or Firm* — Global IP Counselors

(57) ABSTRACT

A support stand includes a stand neck and a stand base. The stand neck includes a base part that is formed at a lower end portion of the stand neck and a plurality of hook tabs that is formed on a side face of the base part and extends downward relative to a top face of the base part. Each of the hook tabs has an engagement prong. The stand base includes a receiving portion that receives the base part of the stand neck within the receiving portion and a plurality of engagement tabs that is formed on a side face of the receiving portion and extends downward relative to a top face of the stand base. Each of the engagement prongs of the hook tabs of the stand neck is engaged from below with respective one of the engagement tabs of the stand base.

10 Claims, 6 Drawing Sheets

SUPPORT STAND FOR ELECTRONIC DEVICE

CROSS-REFERENCE TO RELATED APPLICATIONS

This application claims priority to Japanese Patent Application No. 2008-234551, filed on Sep. 12, 2008. The entire disclosure of Japanese Patent Application No. 2008-234551 is hereby incorporated herein by reference.

BACKGROUND OF THE INVENTION

1. Field of the Invention

The present invention generally relates to a support stand. More specifically, the present invention relates to a support stand for an electronic device.

2. Background Information

A conventional support stand has a stand neck and a stand base that is integrally molded with the stand neck from a synthetic resin. The conventional support stand is generally attached to a conventional liquid crystal television set. However, since the conventional support stand is integrally molded, the conventional support stand is bulky and its packaged size is large, which is disadvantageous in terms of packaging, shipping, storage, and so forth.

A conventional flat panel display includes a coupling structure with which the flat panel display is fixed to a base during assembly (see Japanese Utility Model Registration No. U3072380, for example). With the coupling structure, a bottom end of a support of the flat panel display is placed on a seat of the base. A fixing tab of the base and a hook hole of a fixing plate of the support are fitted and fixed to each other. A clip is fitted through an opening into a slide groove formed on the seat. An elastic hook with a protrusion is slidably fitted into a gap between a bottom plate and a pushbutton of the clip. The bottom plate and a back part of the clip move forward between a bottom end of the support and the fixing plate at a "tighten" position where the clip slides toward the seat, thereby fixing the support. Furthermore, the fixing plate is released at a "loosen" position where the clip retracts from the seat, thereby allowing the support to be removed from the base.

With another conventional liquid crystal television set, a stand member is attached to a housing (see Japanese Laid-Open Patent Application Publication No. 2006-173849, for example). The conventional liquid crystal television set has the housing, the stand member attached to an outside of the housing, and a support member made of sheet metal and disposed on an inside of the housing. A hook component is integrally provided on the inside of the housing. A hook engagement component is provided to the support member. The hook engagement component is engaged with the hook component so that the support member is supported by the housing.

With the conventional coupling structure, the support of the flat panel display is fixed to the base, and the support is removed from the base. However, the coupling structure is complicated. For example, a separate clip has to be used, which means that more parts are required and the cost is higher, and the assembly (coupling) work is also more entailed.

Also, with the conventional liquid crystal television set, the stand member is attached to the housing by using the support member. However, since the support member is used, the greater number of parts drives up the cost.

In view of the above, it will be apparent to those skilled in the art from this disclosure that there exists a need for an improved support stand. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a support stand with a stand neck and a stand base that are easily assembled together.

In accordance with one aspect of the present invention, a support stand includes a stand neck and a stand base. The stand neck is configured to be attached to an electronic device. The stand neck includes a base part that is formed at a lower end portion of the stand neck and a plurality of hook tabs that is formed on a side face of the base part and extends downward relative to a top face of the base part. Each of the hook tabs has an engagement prong. The stand base is fixedly coupled to the stand neck. The stand base includes a receiving portion that receives the base part of the stand neck within the receiving portion and a plurality of engagement tabs that is formed on a side face of the receiving portion and extends downward relative to a top face of the stand base. Each of the engagement prongs of the hook tabs of the stand neck is engaged from below with respective one of the engagement tabs of the stand base.

With the support stand of the present invention, it is possible to provide a support stand with a stand neck and a stand base that are easily assembled together.

These and other objects, features, aspects and advantages of the present invention will become apparent to those skilled in the art from the following detailed descriptions, which, taken in conjunction with the annexed drawings, disclose selected embodiments of the present invention.

DETAILED DESCRIPTION OF THE PREFERRED EMBODIMENT

Selected embodiments of the present invention will now be explained with reference to the drawings. It will be apparent to those skilled in the art from these disclosures that the following descriptions of the selected embodiments of the present invention are provided for illustration only and not for the purpose of limiting the invention as defined by the appended claims and their equivalents.

First Embodiment

Figure 1:
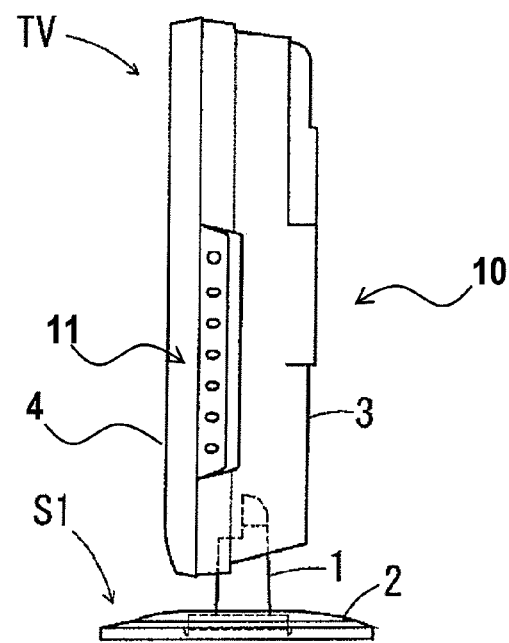
FIG. 1 is a side elevational view of a support stand of a liquid crystal television set in accordance with a first embodiment of the present invention.

As shown in FIG. 1, a liquid crystal television set TV has a liquid crystal module (not shown), a cabinet 10, a support stand S1, and a control key unit 11. The liquid crystal module includes a liquid crystal panel (not shown) to display image. The cabinet 10 has a front cabinet 4 and a rear cabinet 3, and houses the liquid crystal module within an inside space (inner side) of the cabinet 10 defined by the front cabinet 4 and the rear cabinet 3. The front cabinet 4 is rectangular when viewed from a front side of the liquid crystal television set TV, and is made of synthetic resin. The front cabinet 4 is integrally formed as a one-piece, unitary member. The rear cabinet 3 is coupled to a rear side of the front cabinet 4, and is made of synthetic resin. The rear cabinet 3 is integrally formed as a one-piece, unitary member. The front cabinet 4 and the rear cabinet 3 are joined together. The control key unit 11 is used to set various modes.

Figure 2:
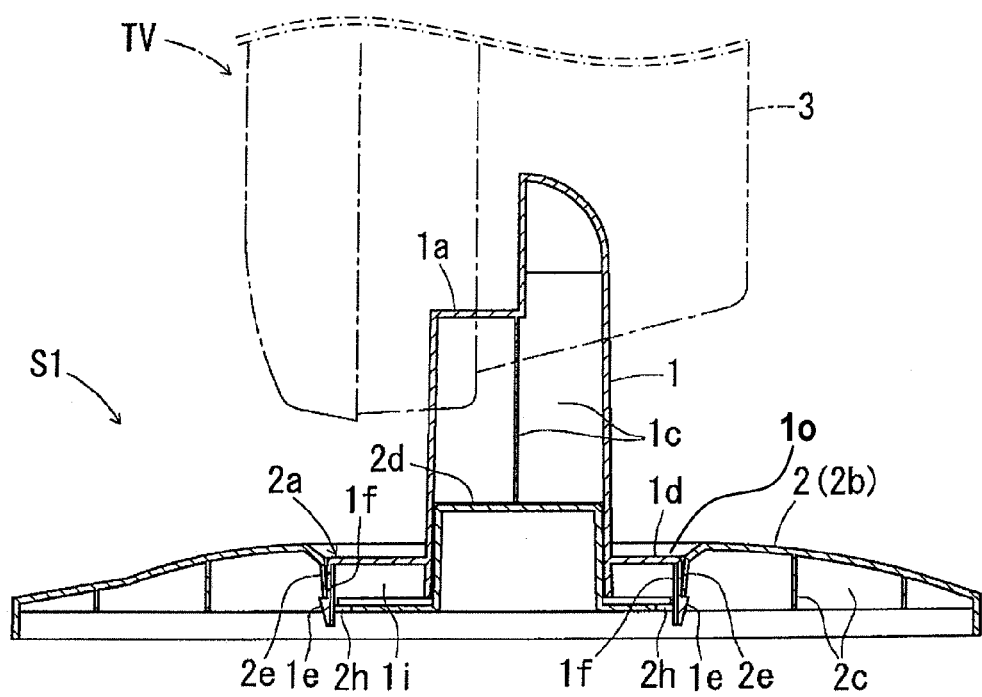
FIG. 2 is a side cross sectional view of the support stand illustrated in FIG. 1.
Figure 3:
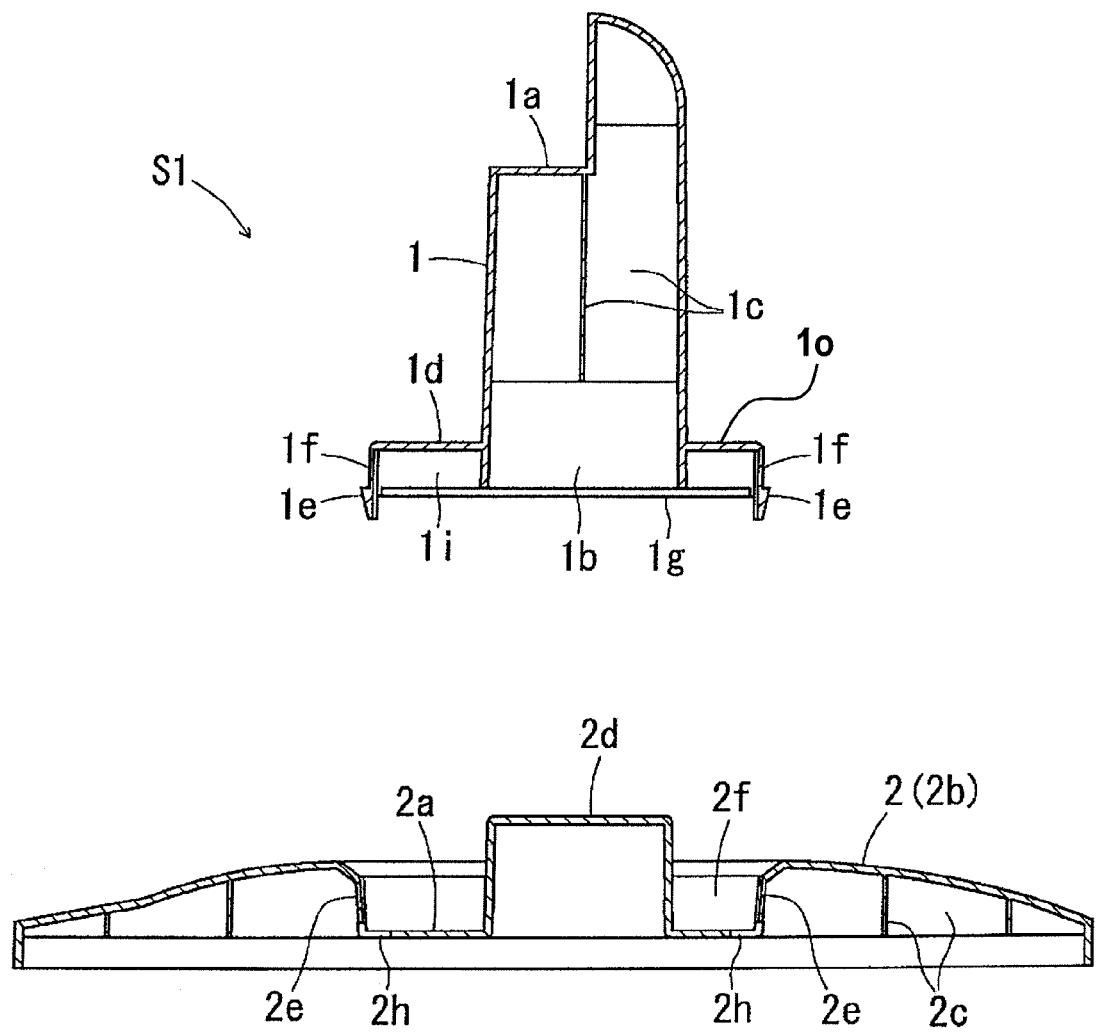
FIG. 3 is an exploded side cross sectional view of the support stand illustrated in FIG. 1.
Figure 4:
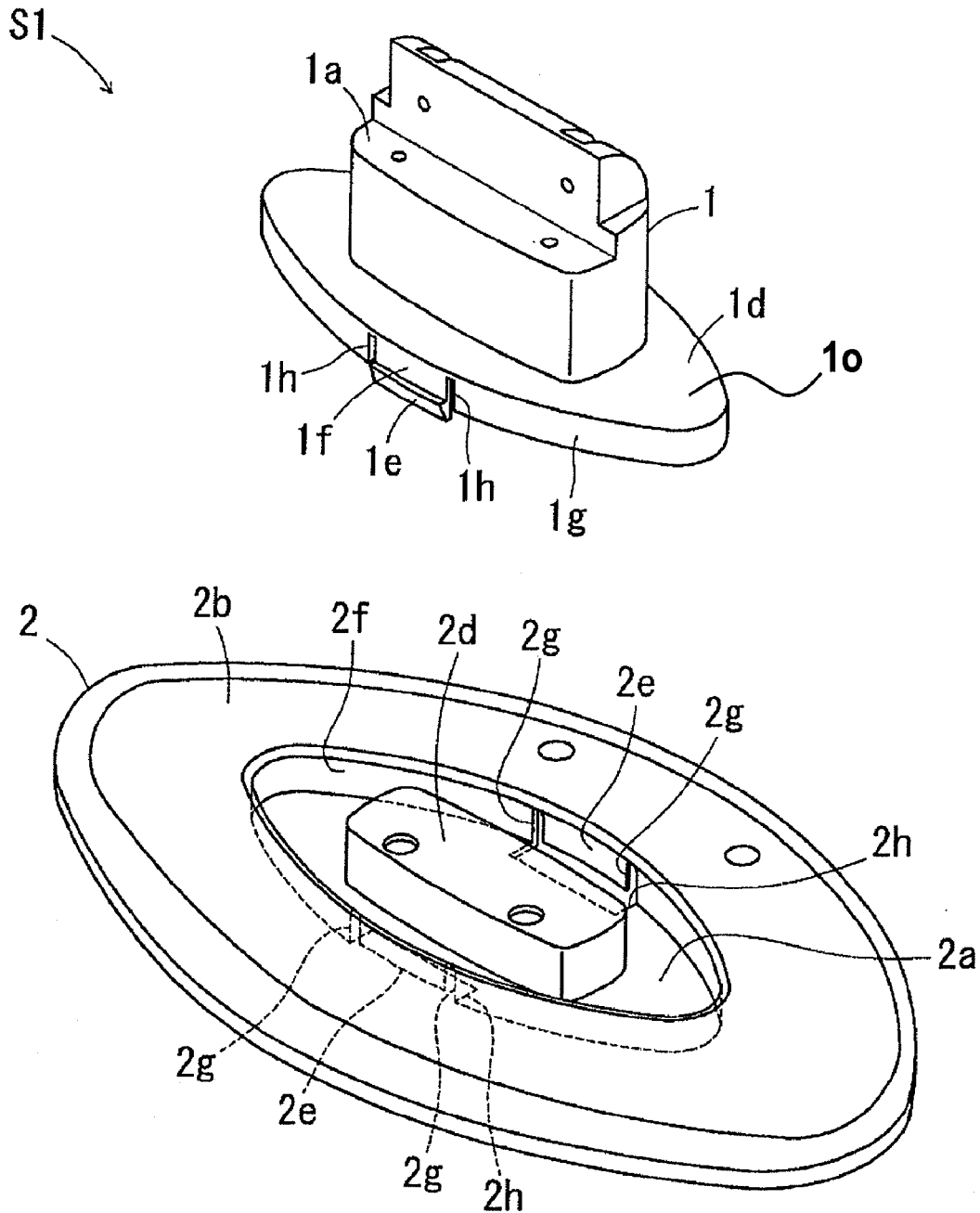
FIG. 4 is an exploded perspective view of the support stand illustrated in FIG. 1.

The support stand S1 supports the liquid crystal television set TV. As shown in FIGS. 2 to 4, the support stand S1 is a separable support stand having two separate parts. Specifically, the support stand S1 has a stand neck 1 and a stand base 2. The stand neck 1 and the stand base 2 are both moldings made by injection molding of synthetic resin. The stand neck 1 is integrally formed as a one-piece, unitary member. The stand base 2 is integrally formed as a one-piece, unitary member. The stand neck 1 and the stand base 2 are separately formed as two separate members. The stand neck 1 and the stand base 2 are attached with screws (not shown) to the rear cabinet 3 of the liquid crystal television set TV via an attachment metal piece (not shown).

The stand neck 1 is hollow and open at a lower end. The stand neck 1 has a ledge 1a that is formed on an upper front face side thereof. The attachment metal piece (not shown) is disposed on the ledge 1a, and is fixed with screws (not shown). The stand neck 1 further has reinforcing partition walls 1c that is formed on an inside of the stand neck 1 except in a lower space 1b into which a convex component 2d of the stand base 2 is inserted. The reinforcing partition walls 1c divide an upper space of the stand neck 1 into four vertically extending spaces.

The stand neck 1 further has a base part 1d and a plurality of (two, for example) hook tabs 1f. The base part 1d is substantially elliptical in plan view. The base part 1d is formed at a lower end portion of the stand neck 1. The base part 1d has a top face (e.g., top wall) 1o and a side face (e.g., side wall) 1g that extends downward relative to the top face 1o and is formed around a peripheral edge of the top face 1o. The base part 1d further has a reinforcing partition wall 1i that is formed on a lower side of the top face 1o and inside of the base part 1d. The base part 1d is designed so that a front edge (e.g., first curved outer surface) of the base part 1d has a radius of curvature that is larger than that of a rear edge (e.g., second curved outer surface) of the base part 1d, and correspondingly, a front edge (e.g., first curved inner surface) of a recess 2a (discussed below) of the stand base 2 has a radius of curvature that is larger than that of a rear edge (e.g., second curved inner surface) of the recess 2a. Therefore, the front and rear relationship of the stand neck 1 and the stand base 2 will not accidentally be reversed in assembly.

The hook tabs 1f are formed on the side face 1g in the middle of the front edge of the base part 1d and in the middle of the rear edge of the base part 1d. The hook tabs 1f extend downward relative to the top face 1o. Each of the hook tabs 1f has an engagement prong 1e. As shown in FIG. 4, the side face 1g has a plurality of (two, for example) pairs of vertical cut grooves 1h that defines each of the hook tabs 1f between respective one of the pairs of the vertical cut grooves 1h. The hook tabs 1f are located on side wall portions between the vertical cut grooves 1h. Each of the hook tabs 1f is formed as an independent, downward-facing rib-shaped tab, and has a free distal end. Each of the engagement prongs 1e has a right triangular cross sectional shape, and is formed on a lower outer face of each of the hook tabs 1f. Material is removed from an inner face side of each of the hook tabs 1f so that the thickness of the hook tabs 1f is about half the thickness of a portion of the side face 1g other than the hook tabs 1f, which allows for relatively easy elastic bending and deformation.

The stand base 2 is substantially elliptical in plan view and is much larger than the base part 1d of the stand neck 1. The stand base 2 has the recess (e.g., receiving portion) 2a in a center portion of the stand base 2. The recess 2a receives the base part 1d of the stand neck 1 within the recess 2a. The recess 2a is substantially elliptical and mates with the base part 1d of the stand neck 1. The stand base 2 also has a top plate 2b that rises up in a gentle humped curve from a peripheral edge of the stand base 2 toward an upper end opening edge (e.g., upper opening edge) of the recess 2a, and reinforcing partition walls 2c that are formed on a lower side of the top plate 2b.

The recess 2a is designed so that the front edge of the recess 2a has a radius of curvature that is larger than that of the rear edge of the recess 2a, corresponding to the base part 1d of the stand neck 1. Thus, the front and rear relationship of the stand neck 1 and the stand base 2 will not accidentally be reversed in assembly. The stand base 2 further has a hollow convex component 2d that is formed on a bottom face of the recess 2a within the recess 2a. The convex component 2d is substantially cuboid in shape and opens toward a lower end of the convex component 2d. The convex component 2d is inserted from below into the lower space 1b of the stand neck 1 when the base part 1d of the stand neck 1 is fitted into the recess 2a from above, so the stand neck 1 and the stand base 2 can be fitted snugly together.

The stand base 2 further has a plurality of (two, for example) downward-facing rib-shaped engagement tabs 2e. The engagement tabs 2e are formed, corresponding to the hook tabs 1f of the stand neck 1, on a side face (e.g., side wall) 2f of the recess 2a of the stand base 2 in the middle of the front edge of the recess 2a and in the middle of the rear edge of the recess 2a. The bottom face of the recess 2a further has two cut-outs 2h at locations where the engagement tabs 2e are formed. The engagement prongs 1e of the hook tabs 1f are passed through the cut-outs 2h and latched to the engagement tabs 2e. As shown in FIG. 4, the side face 2f has a plurality of (two, for example) pairs of vertical cut grooves 2g that defines each of the engagement tabs 2e between respective one of the pairs of the vertical cut grooves 2g. The engagement tabs 2e are located on side wall portions between the vertical cut grooves 2g. Each of the engagement tabs 2e is formed as an independent, downward-facing rib-shaped tab, and has a free distal end. Material is removed from an outer face side of each of the engagement tabs 2e so that the thickness of the engagement tabs 2e is about half the thickness of a portion of the side face 2f other than the engagement tabs 2e, which allows for relatively easy elastic bending and deformation. The side face 2f of the recess 2a slants slightly inward so that its lower end enters the recess 2a. Furthermore, the engagement tabs 2e slant slightly to the inside of the recess 2a. In other words, the engagement tabs 2e slant inward of the recess 2a relative to the upper end opening edge of the recess 2a as approaching toward distal ends (e.g., distal end portion) of the engagement tabs 2e.

The separable support stand S1 is such that the stand neck 1 is attached to the rear cabinet 3 of the liquid crystal television set TV, and is packaged along with the liquid crystal television set TV with the stand base 2 separated from the stand neck 1. Therefore, it is not as bulky as a conventional one-piece support stand, with which the liquid crystal television set is packaged with the one-piece support stand attached. Thus, the package size can be reduced, which is advantageous in terms of packaging, shipping, storage, and so forth.

When the base part 1d of the stand neck 1 is fitted from above into the recess 2a of the stand base 2, the hook tabs 1f formed on the side face 1g of the base part 1d and the engagement tabs 2e formed on the side face 2f of the recess 2a undergo elastic bending deformation relatively easily away from one another. As a result, the engagement prongs 1e of the hook tabs 1f can easily pass through the cut-outs 2h formed in the bottom face of the recess 2a of the stand base 2 and engage from below with the engagement tabs 2e, respectively. Therefore, the stand neck 1 and the stand base 2 are integrally coupled so as not to come apart, which means that assembling the support stand S1 becomes an extremely easy job, and can be accomplished reliably by the user. Furthermore, since no other parts whatsoever are needed for assembly, there is no increase in cost at all due to an increase in the number of parts.

Figure 5:
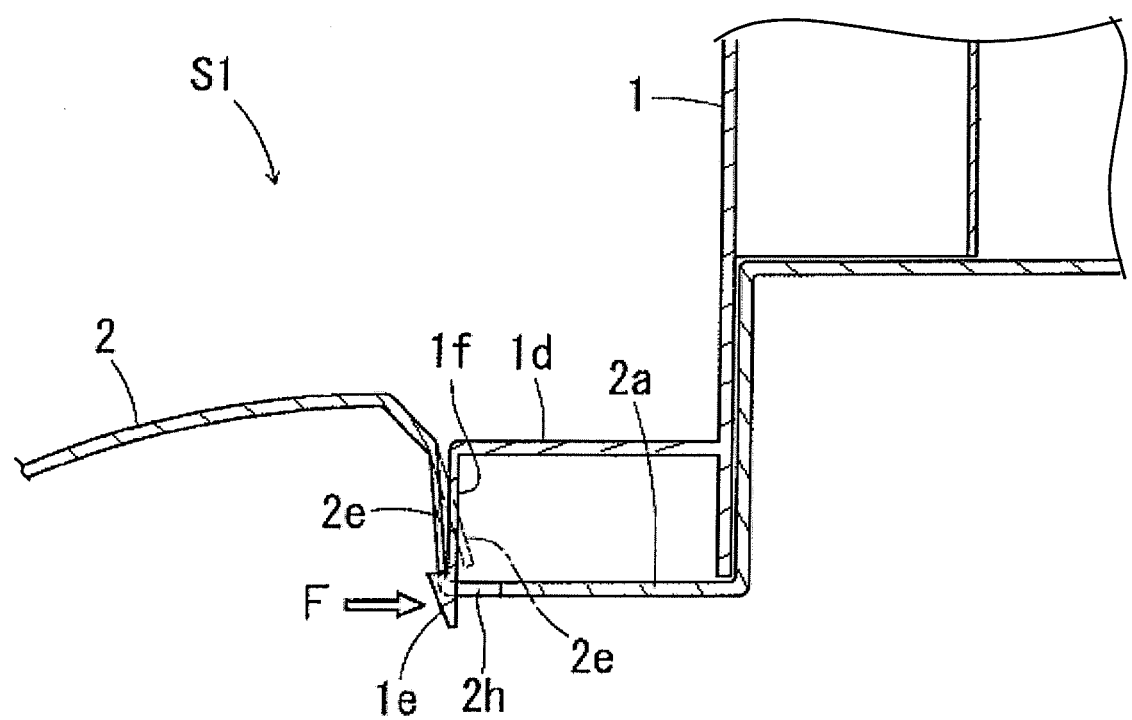
FIG. 5 is a detailed side cross sectional view of the support stand illustrated in FIG. 1.

As shown in FIG. 5, when the support stand S1 is assembled, even if an external force F should be exerted in a direction in which the engagement prongs 1e of the hook tabs 1f come loose from the engagement tabs 2e, the engagement tabs 2e undergo elastic bending deformation relatively easily in the direction of the external force F, while latching with the engagement prongs 1e of the hook tabs 1f. Thus, there is no worry that the engagement prongs 1e will readily come loose from the engagement tabs 2e. It is difficult to obtain this action and effect with a constitution in which the engagement prongs of the hook tabs are engaged from below with the side face of the recess of the stand base, which do not readily undergo elastic bending and deformation. Furthermore, the engagement tabs 2e extend downward and slightly slant to the inside of the recess 2a. Specifically, the inward direction of the recess 2a relative to the side face 2f in which the engagement tabs 2e are inclined is the same as the direction in which the engagement prongs 1e of the hook tabs 1f moves when subjected to the external force F. Thus, the engagement tabs 2e conform even more to the engagement prongs 1e when subjected to the external force F. Accordingly, it is even less likely that the engagement prongs 1e will come loose. Also, the engagement tabs 2e are such that the vertical cut grooves 2g are provided to the side face 2f of the recess 2a in the stand base 2, the side wall portions between the cut grooves 2g is in the form of the rib-shaped tab, and the rib-shaped tab is thinner than the side face 2f. Therefore, when the external force F is exerted, the thinner engagement tabs 2e conform to the engagement prongs 1e, resulting in even better bending and deformation. As a result, the engagement prongs 1e are even less likely to come loose from the engagement tabs 2e.

With the support stand S1, two of the hook tabs 1f and two of the engagement tabs 2e are formed, but three or more of each can be used instead, of course. Also, the support stand S1 is attached to the liquid crystal television set TV, but it should go without saying that it can instead be attached to an electronic device other than a liquid crystal television set, such as a flat panel display of a personal computer.

Second Embodiment

Figure 6A:
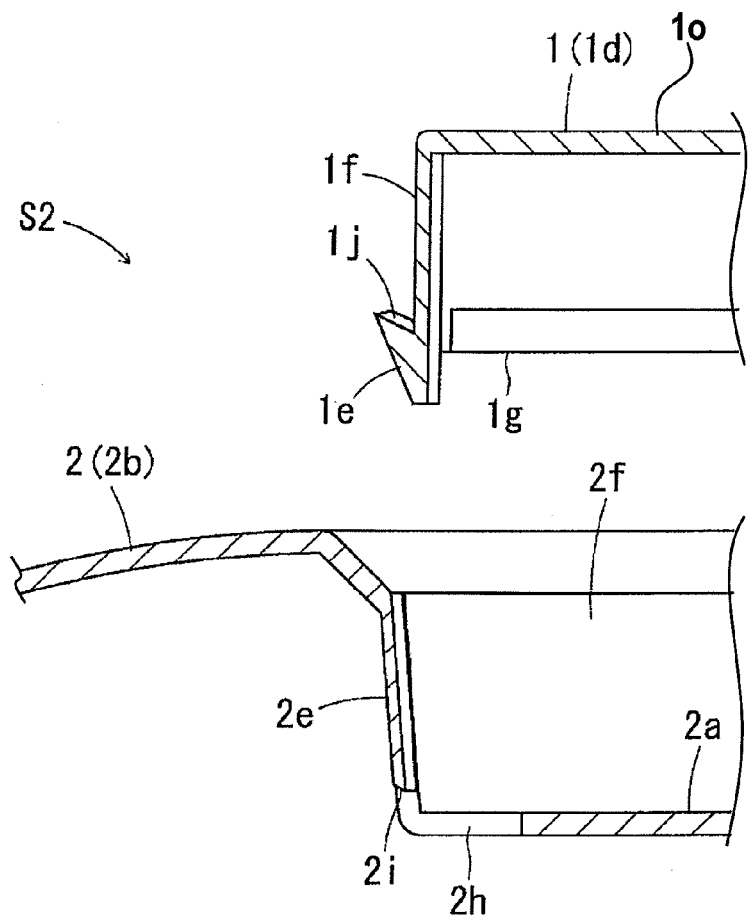
FIG. 6A is a detailed exploded side cross sectional view of a support stand in accordance with a second embodiment of the present invention.
Figure 6B:
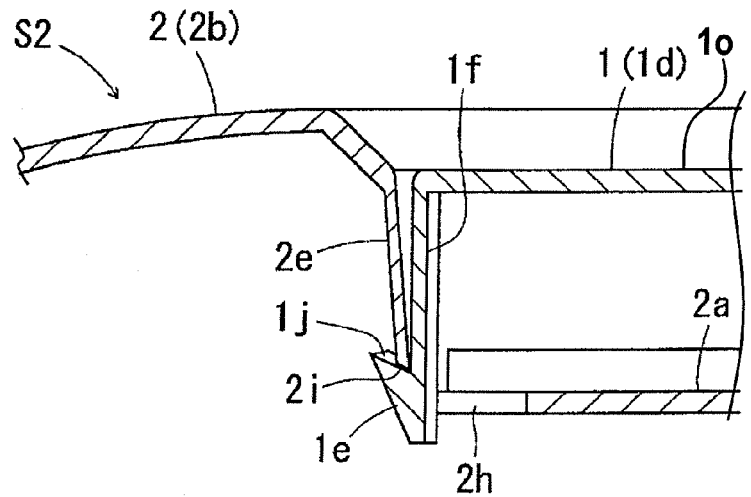
FIG. 6B is a detailed side cross sectional view of the support stand illustrated in FIG. 6A.

Referring now to FIGS. 6A and 6B, a support stand S2 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

With the separable support stand S2, each of the engagement prongs 1e of the hook tabs 1f further includes a slanted upper faces 1j. Each of the slanted upper face 1j slants upward as approaching toward an outer distal end (e.g., distal end portion) of each of the engagement prongs 1e that is located outermost location of each of the engagement prongs 1e relative to each of the hook tabs 1f. In other words, each of the slanted upper face 1j inclines upward as approaching outward of the engagement prongs 1e. Furthermore, each of the engagement tabs 2e further includes a slanted lower end face 2i. Each of the slanted lower end faces 2i slants corresponding to the slanted upper faces 1j of the engagement prongs 1e. In particular, each of the slanted lower end faces 2i inclines upward as approaching outward of each of the lower end faces 2i relative to the center of the recess 2a. With the support stand S2, even if an external force should be exerted in a direction in which the engagement prongs 1e come loose from the engagement tabs 2e, the slanted upper faces 1j of the engagement prongs 1e are engaged with the slanted lower end faces 2i of the engagement tabs 2e in the direction in which the external force is exerted, as shown in FIG. 6B. In particular, the slanted upper faces 1j of the engagement prongs 1e and the slanted lower end faces 2i of the engagement tabs 2e are engaged so that the engagement prongs 1c will not come loose from the engagement tabs 2e. Thus, it is extremely unlikely that the engagement prongs 1e will come loose from the engagement tabs 2e.

There are no particular restrictions on an angle of inclination of the slanted upper faces 1j of the engagement prongs 1e and the slanted lower end faces 2i of the engagement tabs 2e. However, setting the angle between the slanted upper faces 1j and a horizontal direction that is parallel to the top face 1o of the base part 1d to about 10 to 30° is favorable. Furthermore, setting the angle between the slanted lower end faces 2i and a horizontal direction that is parallel to the bottom face of the recess 2a to about 10 to 30° is favorable. If the inclination angle is less than 10°, this will diminish the effect of preventing the engagement prongs 1e from coming loose, but if the inclination angle is greater than 30°, it will be harder to engage the engagement prongs 1e with the engagement tabs 2e, so neither extreme is desirable.

Third Embodiment

Figure 7A:
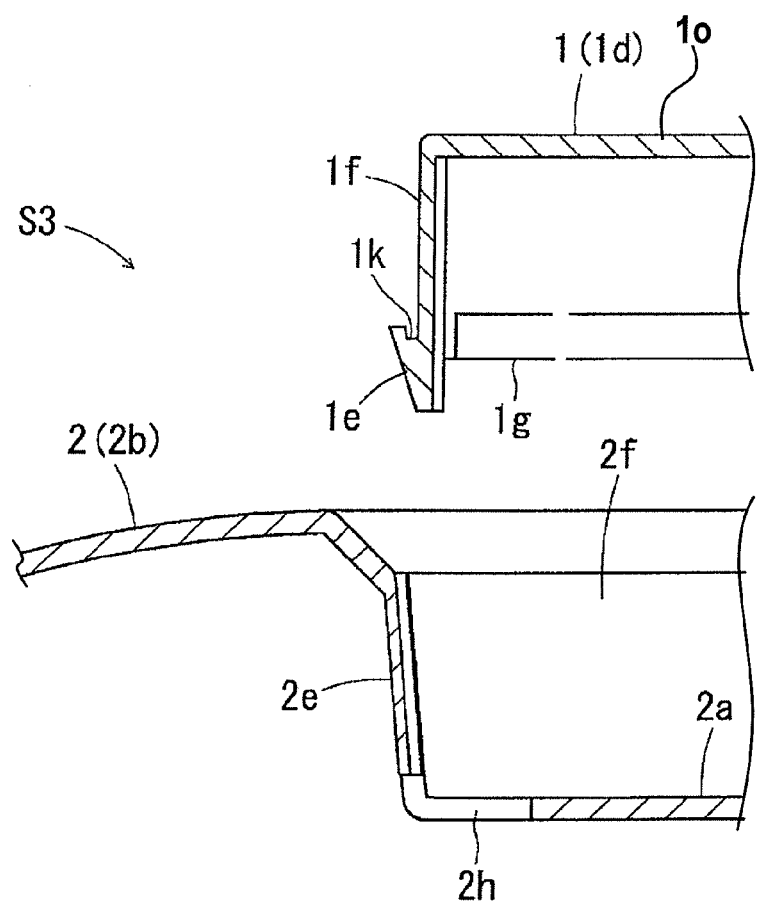
FIG. 7A is a detailed exploded side cross sectional view of a support stand in accordance with a third embodiment of the present invention.
Figure 7B:
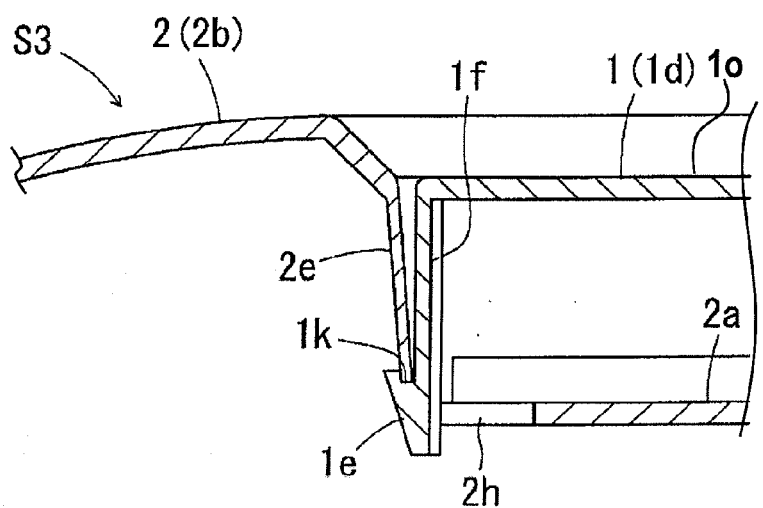
FIG. 7B is a detailed side cross sectional view of the support stand illustrated in FIG. 7A.

Referring now to FIGS. 7A and 7B, a support stand S3 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

With the support stand S3, each of the engagement prongs 1e of the hook tabs 1f further includes a recess groove 1k that is formed in an upper face of each of the engagement prongs 1e of the hook tabs 1f. Lower end portions of the engagement tabs 2e are fitted into the recess grooves 1k, respectively. As a result, the engagement prongs 1e and the engagement tabs 2e are engaged in a state in which the lower end portions of the engagement tabs 2e are fitted into the recess grooves 1k. With this configuration, even if an external force should be exerted in the direction in which the engagement prongs 1e come loose from the engagement tabs 2e, as shown in FIG. 7B, side faces of the recess grooves 1k are engaged with outer faces of the lower end portions of the engagement tabs 2e in the direction in which the external force is exerted. Specifically, the lower end portions of the engagement tabs 2e are fitted into the recess grooves 1k of the engagement tabs 2e so that the engagement prongs 1e will not come loose from the engagement tabs 2e. Thus, it is extremely unlikely that the engagement prongs 1e will come loose from the engagement tabs 2e.

There are no particular restrictions on the depth of the recess grooves 1k. However, it is favorable for the depth to be about 0.1 to 0.5 mm. If the depth is less than 0.1 mm, this will diminish the effect of preventing the engagement prongs 1e from coming loose, but if the depth is greater than 0.5 mm, it will be harder to engage the engagement prongs 1e with the engagement tabs 2e without any looseness in the up and down direction, so neither extreme is desirable.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal television set equipped with the present invention. Accordingly, these terms, as utilized to describe the present invention should be interpreted relative to a liquid crystal television set equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A support stand comprising:
a stand neck configured to be attached to an electronic device, the stand neck including a base part that is formed at a lower end portion of the stand neck and a plurality of hook tabs that is formed on a side face of the base part and extends downward relative to a top face of the base part, each of the hook tabs having an engagement prong; and
a stand base fixedly coupled to the stand neck, the stand base including a receiving portion that receives the base part of the stand neck within the receiving portion and a plurality of engagement tabs that is formed on a side face of the receiving portion and extends downward relative to a top face of the stand base, each of the engagement prongs of the hook tabs of the stand neck being engaged from below with respective one of the engagement tabs of the stand base,
each of the engagement tabs inclining inward of the receiving portion relative to an upper opening edge of the receiving portion as approaching toward a distal end portion of each of the engagement tabs,
the receiving portion further having a plurality of pairs of vertical cut grooves that is formed on the side face of the receiving portion to define each of the engagement tabs between respective one of the pairs of the vertical cut grooves, the engagement tabs being thinner than a portion of the side face of the receiving portion other than the engagement tabs.

2. The support stand according to claim 1, wherein
each of the engagement prongs of the hook tabs of the stand neck further has a slanted upper face that slants upward as approaching toward a distal end portion of each of the engagement prongs, and
each of the engagement tabs of the stand base further has a slanted lower face that slants corresponding to the slanted upper face of respective one of the engagement prongs.

3. The support stand according to claim 1, wherein
each of the engagement prongs of the hook tabs of the stand neck further has a groove portion, a distal end portion of each of the engagement tabs of the stand base being fitted into the groove portion of respective one of the engagement prongs of the hook tabs of the stand neck.

4. The support stand according to claim 2, wherein
the side face of the base part of the stand neck further has first and second curved outer surfaces that have different radius of curvature, and
the side face of the receiving portion of the stand base further has first and second curved inner surfaces that have different radius of curvature corresponding to the first and second curved outer surfaces, respectively.

5. The support stand according to claim 3, wherein
the side face of the base part of the stand neck further has first and second curved outer surfaces that have different radius of curvature, and
the side face of the receiving portion of the stand base further has first and second curved inner surfaces that have different radius of curvature corresponding to the first and second curved outer surfaces, respectively.

6. A support stand comprising:
a stand neck configured to be attached to an electronic device, the stand neck including a base part that is formed at a lower end portion of the stand neck and a plurality of hook tabs that is formed on a side face of the base part and extends downward relative to a top face of the base part, each of the hook tabs having an engagement prong, and
a stand base fixedly coupled to the stand neck, the stand base including a receiving portion that receives the base part of the stand neck within the receiving portion and a plurality of engagement tabs that is formed on a side face of the receiving portion and extends downward relative to a top face of the stand base, each of the engagement prongs of the hook tabs of the stand neck being engaged from below with respective one of the engagement tabs of the stand base, the receiving portion further having a plurality of pairs of vertical cut grooves that is formed on the side face of the receiving portion to define each of the engagement tabs between respective one of the pairs of the vertical cut grooves, the engagement tabs being thinner than a portion of the side face of the receiving portion other than the engagement tabs.

7. The support stand according to claim 6, wherein the stand neck and the stand base are separately formed as two separate members.

8. The support stand according to claim 6, wherein each of the engagement prongs of the hook tabs of the stand neck further has a slanted upper face that slants upward as approaching toward a distal end portion of each of the engagement prongs, and each of the engagement tabs of the stand base further has a slanted lower face that slants corresponding to the slanted upper face of respective one of the engagement prongs.

9. The support stand according to claim 6, wherein each of the engagement prongs of the hook tabs of the stand neck further has a groove portion, a distal end portion of each of the engagement tabs of the stand base being fitted into the groove portion of respective one of the engagement prongs of the hook tabs of the stand neck.

10. The support stand according to claim 6, wherein the side face of the base part of the stand neck further has first and second curved outer surfaces that have different radius of curvature, and the side face of the receiving portion of the stand base further has first and second curved inner surfaces that have different radius of curvature corresponding to the first and second curved outer surfaces, respectively.

\* \* \* \* \*